May 21, 1968   J. C. GALT ET AL   3,384,692
METHOD FOR PRODUCING SQUARE-MESH NET STRUCTURE
Filed Dec. 6, 1962   3 Sheets-Sheet 1
FIG. 1
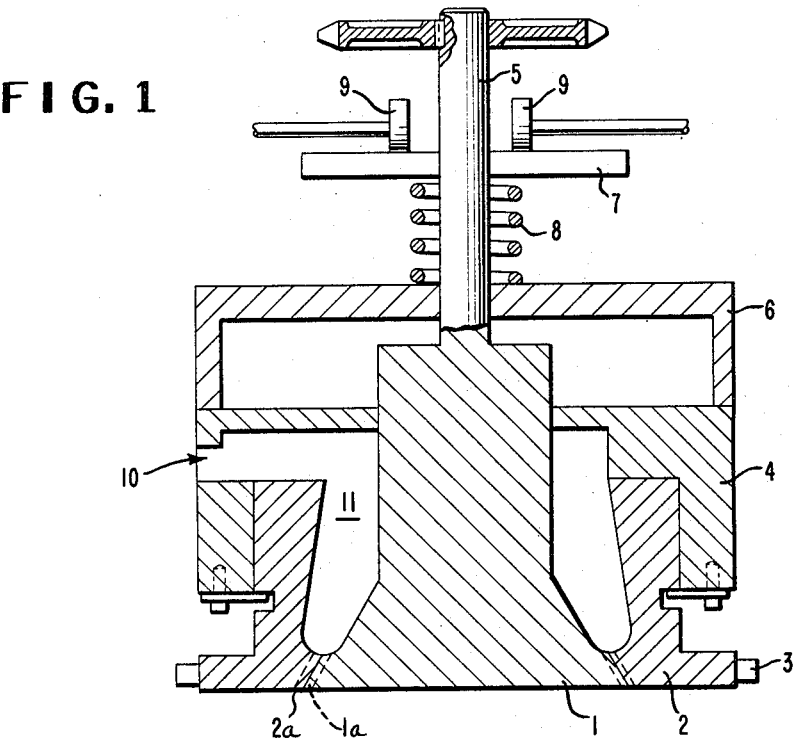
FIG. 2   FIG. 3   FIG. 4
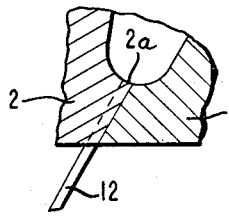   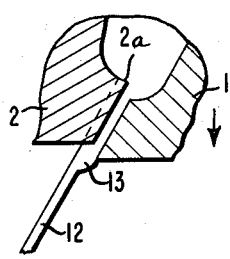   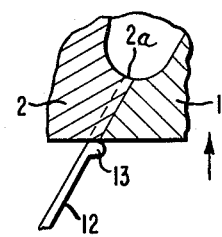
INVENTORS
JAMES C. GALT
CHRISTIAN B. LUNDSAGER
BY *Herbert M Wolfson*
ATTORNEY May 21, 1968  J. C. GALT ET AL  3,384,692

METHOD FOR PRODUCING SQUARE-MESH NET STRUCTURE

Filed Dec. 6, 1962  3 Sheets-Sheet 2

INVENTOR
JAMES C. GALT
CHRISTIAN B. LUNDSAGER

BY *Herbert M. Wolfson*
ATTORNEY

INVENTORS
JAMES C. GALT
CHRISTIAN B. LUNDSAGER
BY *Herbert M. Wolfson*
ATTORNEY

United States Patent Office 3,384,692
Patented May 21, 1968

3,384,692
METHOD FOR PRODUCING SQUARE-MESH NET STRUCTURE
James C. Galt, Richmond, Va., and Christian B. Lundsager, Rockville, Md., assignors to E. I. du Pont de Nemours and Company, Wilmington, Del., a corporation of Delaware
Filed Dec. 6, 1962, Ser. No. 242,783
2 Claims. (Cl. 264—167)

This invention relates to a process for producing plastic netting continuously.

Plastic netting such as that produced according to Mercer, U.S. Patent 2,919,467 is being introduced to the trade in various forms for a wide variety of uses. For example, plastic net bags are being used for packaging of produce and various manufactured articles. One of the drawbacks in the existing types of net bags having diamond-shaped mesh is the lack of circumferential dimensional stability. This results in a package having distorted appearance and variable volume.

It is, therefore, an object of this invention to provide a process for preparing netting having strands substantially perpendicular to each other. A further object is to provide such a process for producing tubular netting having circular transverse strands. A still further object is to provide such a process which will produce such netting continuously. Other objects will appear hereinafter.

These and other objects are accomplished by the instant invention which comprises extruding streams of plastic to form parallel strands from extrusion orifices and periodically forming circular strands of plastic in the form of rings substantially transverse to the direction of extrusion adjacent to said parallel strands as they emerge from their orifices. Since a single die is used, the intersections between the circular strands and the parallel strands of the adjacent layer are extended integrally.

In the method according to this invention the parallel strands referred to above may have a single concentric layer of parallel strands or it may be two or more crossing layers of strands produced according to Mercer, U.S. Patent 2,919,467 or assignee's application of Anderson and Lundsager, United States Ser. No. 71,506, filed Nov. 25, 1960. This invention is intended to include an improvement in the methods of the inventions in the latter mentioned patent and application. By this it is meant that the methods of the latter inventions can be used together with the improvement of this invention to produce a wide variety of plastic netting having transverse strands with integrally extruded unitary intersections between all layers of strands.

The product embodiments of this invention may consist of a single layer of continuous parallel longitudinal strands having a plurality of transverse strands, or, it may consist of a number of crossing layers of longitudinal strands with a single layer of transverse strands. In all cases, the intersections between adjacent layers are integrally extruded unitary intersections.

The apparatus embodiments of this invention may consist of apparatus substantially as described in Mercer, U.S. Patent 2,919,467 or in assignee's aplication of Anderson and Lundsager, U.S. Ser. No. 71,506, filed Nov. 25, 1960 and now U.S. Patent 3,163,691 with the improvement consisting of means to periodically separate the concentric die-carrying members so as to extrude transverse ring-shaped strands adjacent to one of the layers of longitudinal strands. Examples of exact means for accomplishing this will be described in detail in this specification.

The invention will now be more particularly described in reference to the appended drawings wherein:

FIGURE 1 illustrates in section one of the apparatus embodiments of the invention wherein tubular diamond-mesh net can be extruded having transverse strands.

FIGURES 2, 3 and 4 are fragmentary sectional views of the dies of an apparatus similar to the one in FIGURE 1.

Figure 5:
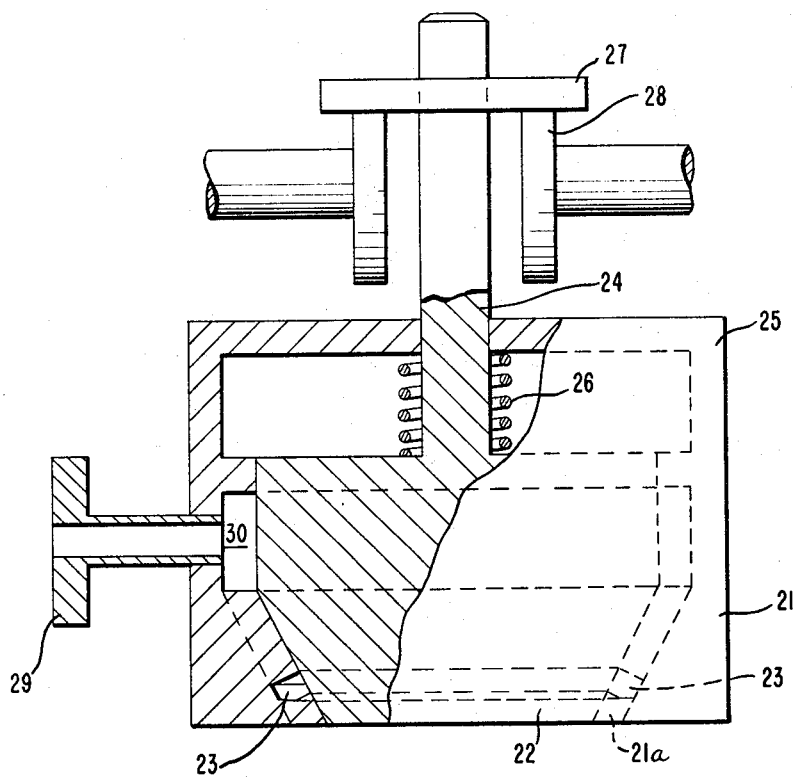
FIGURES 5, 5A, 6 and 6A are sectional views of different apparatus embodiments of the invention.

Referring to FIGURE 1, the apparatus is equipped with inner die-carrying member 1 and outer die-carrying member 2, which contain dies 1a and 2a in the form of grooves opening on the surfaces of contact between the two members 1 and 2. Outer member 2 has sprocket teeth 3 for engagement with means to impart rotation, e.g., chain, gears and other means known in the art. The upper portion of member 2 extends through housing 4 where an appropriate seal is formed to permit movement. Shaft 5 is attached to member 1 and extends through upper housing member 6 and has a horizontal plate 7 attached thereto. A spring 8 is situated between plate 7 and member 6 to hold member 1 in place. Cams 9 are rotated by suitable means not shown, and act on the surface of plate 7 so as to periodically depress member 1. This causes a separation between members 1 and 2 at their surfaces of contact. Molten polymer is fed by suitable means through orifice 10 and flows into polymer cavity 11. As pressure is applied the polymer flows out through grooves 1a and 2a forming strands. Members 1 and 2 are adapted for rotation and if contra-rotated during extrusion the strands form a diamond-mesh net with unitary, extruded intersections. If cams 9 are operated during this extrusion a ring of polymer will intermittently be formed by the polymer flowing out between the surfaces of the die-carrying members 1 and 2 during separation.

In FIGURE 2 the portions of members 1 and 2 are shown in section at their surface of contact with strand 12 being extruded. Only die grooves 2a are shown; die grooves 1a shown in FIGURE 1 were omitted for the sake of simplicity. When cams 9 cause the depression of member 1 the separation of surfaces between members 1 and 2 is shown in FIGURE 3. The polymer being extruded in strand 12 now flows between members 1 and 2 forming the portion 13 integrally with strand 12. In FIGURE 4 member 1 is shown back in position and polymer portion 13 is now a transverse ring whose plane is parallel to the plane of the face of the dies. Ring 13 is, therefore, a transverse strand integrally extruded with strand 12.

Figure 5A:
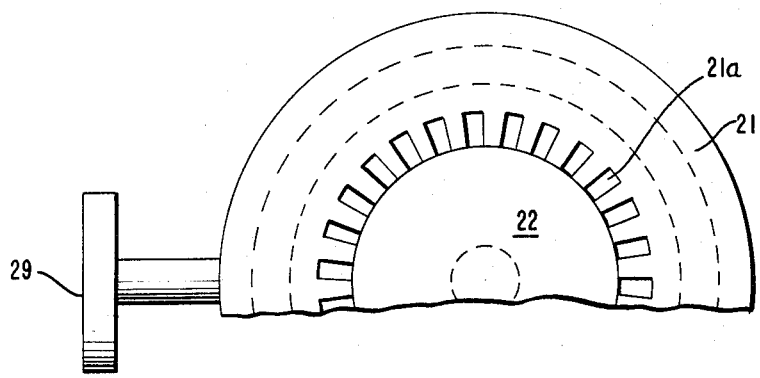

FIGURES 5 and 5A illustrate another apparatus for producing the products of this invention. The housing 21 is provided with a circular opening at the base with strand-forming dies 21a in the form of grooves around the periphery of the opening. Inner member 22 fits in this opening and has a close surface of contact with the grooved circular opening. Annular groove 23 is a transverse groove in the housing 21 which serves to interconnect the strand-forming die grooves 21a. The upper portion of member 22 extends through the housing 21 where an appropriate seal is formed to permit movement of member 22 with continuous sealing throughout. On the upper part of member 22 is attached a shaft 24 which extends through upper housing member 25. A spring 26 is positioned in compression between the top of inner member 22 and the interior surface of upper housing member 25 thus holding inner member 22 tightly within the housing 21. Horizontal disc 27 is attached to shaft 24 and is acted on from below by rotary cams 28. As the cams are rotated the inner member 22 is intermittently elevated thus producing a separation between member 22 and the housing 21 at the die face. Instead of using cams 28 in combination with disc 27 to lift member 22 periodically, electrical means or magnetic means or both may be used.

The housing 21 is provided with an inlet feed part 29 through which molten polymer may be introduced under pressure to polymer cavity 30. The polymer will flow down through die grooves 21a and produce individual strands. In addition, the polymer will flow through interconnecting groove 23 forming a reservoir of polymer close to the die face. As inner member 22 is elevated, the polymer will flow down between it and the housing as well as down through grooves 21a. When inner member 22 is lowered into place again the polymer is again extruded only from strand-extruding die grooves 21a. Thus, the operation of this apparatus, as that described in FIGURES 1 through 4, provides periodic extrusion of a transverse ring of polymer integrally with the strands. The exact way in which this formation takes place is substantially the same as that depicted in FIGURES 2 through 4. One of the chief differences between the apparatus in FIGURE 1 and that in FIGURE 5 is that the latter do not rotate and form only one layer of strands in the machine direction.

Figure 6:
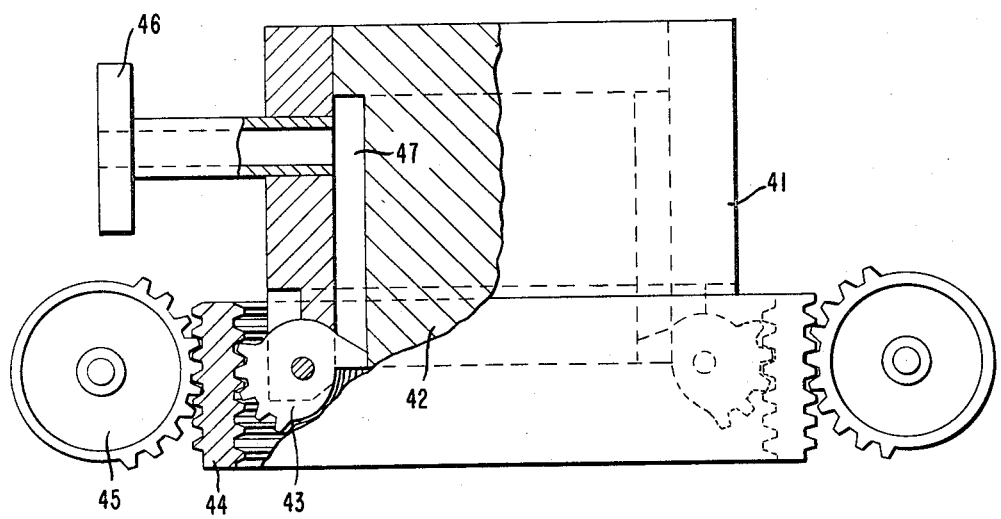
Figure 6A:
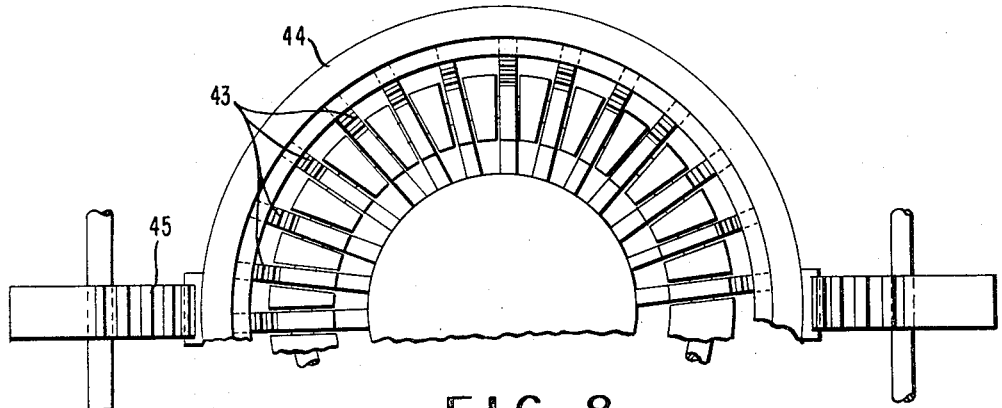

FIGURES 6 and 6A depict still another embodiment of an apparatus according to this invention. The housing 41 has a solid cylindrical inner member 42 set therein. The housing surrounds the inner member leaving a free annular space all around extending down to the die face. Mounted in the housing peripherally around the inner member are a plurality of equally spaced finger pinions 43, the finger ends of which can extend radially across the annular space and when in this position form a plurality of slots in the annular space so that it is only capable of extruding individual strands therethrough. At the opposite end of the finger pinions 43 from the finger portions are radial gear teeth which are so positioned that they extend beyond the exterior of the housing. When the finger pinions are periodically rotated from the position shown in FIGURE 6, the finger portions drop down and free the entire annular space so that a solid transverse ring of plastic can be extruded during this interval. This rotation is effected by a short, hollow cylindrical rack 44 which has gear ribs on its interior to engage with the teeth on the finger pinions 43 and gear ribs on its exterior to engage with the teeth of the oscillating drive pinions 45. It can be seen that the latter, which are oscillated by suitable means known in the art, cause periodic movement of the fingers in the annular space. If molten polymer is fed into inlet port 46, it will fill annular polymer cavity 47 and flow downward. When the fingers are in position, the polymer will flow between them forming individual strands; when the fingers are rotated downward, the polymer will flow from the annular space in a solid transverse ring. It is obvious that as the fingers are oscillated in and out of position that a net will be formed of parallel individual strands in the machine direction with a plurality of transverse strands integrally extruded along the length of the net.

Figure 7:
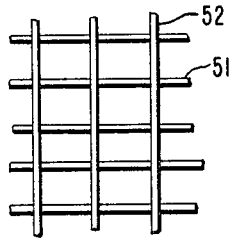
FIGURES 7 and 8 are partial views of nets embodied in the invention having integral transverse strands.
Figure 8:
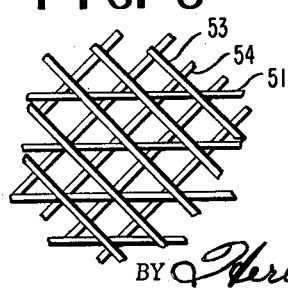

The portion of net shown in FIGURE 7 may be produced by the apparatus described in FIGURES 5 and 6. It consists of strands 51 running in the transverse direction integrally extruded with strands 52 running in the machine direction. The portion of net shown in FIGURE 8 may be produced by the apparatus in FIGURE 1. It consists of transverse strands 51 and layers of diagonal strands 53 and 54. The net shown is an integrally extruded structure. Although only two designs of netting are depicted herein, this invention includes any of the net designs shown in Mercer, U.S. Patent 2,919,467 or assignee's application of Anderson and Lundsager, Ser. No. 71,506, filed Nov. 25, 1960, with the improvement of having integrally extruded transverse strands. These nets can be produced by the adaptation of the process and apparatus improvements taught in this invention to the process and apparatus embodiments of the latter invention patent and application.

Netting produced according to this invention has many advantages. The transverse strands in tubular netting add dimensional stability and strength. Bags made from such netting resist deformation better thus retaining their shape and reducing breakage. Filter cores made from rigid extruded net tubes having transverse strands have much higher compressive strength and also resist deformation.

The tubular netting of this invention can be slit to produce flat netting comprising a first series of parallel strands or a first series of diagonally intersecting strands in combination with a second series of parallel strands, the second series being at an angle, to preferably perpendicular to (at an angle of 90 degrees), the direction of extrusion of the first series. In this way, netting consisting solely of transverse strands and longitudinal strands for use in plastic window screens can be formed. This product has improved dimensional stability over netting in which the strands do not cross at a 90° angle and therefore, is particularly useful for drainage aids, carpet underlay, fencing buckram, industrial belting as well as window screening. Where exposure to sunlight is involved, as in window screening, it is important that the material of which the netting is composed be resistant to degradation by ultraviolet light. Whenever one wishes to make these materials from polyolefins or other resins which may be deficient in this respect, the disadvantage can be overcome by incorporating into the polymer resin prior to extrusion one of the well known ultraviolet light absorbers, e.g., 2-hydroxy-4-methoxybenzophenone or the like.

What is claimed is:

1. A method of manufacturing an integral tubular plastic net-like structure which comprises extruding a plurality of substantially parallel streams of plastic spaced from each other and disposed in the form of a circle; periodically forming strands of plastic in the form of rings transverse to the direction of extrusion adjacent to said parallel streams as said streams emerge from their orifices; and extruding unitary intersections between said rings and the parallel streams whereby said rings are attached to said streams at said intersections.

2. A method of making integral seamless tubular plastic net-like structure which comprises extruding a plastic melt simultaneously through a plurality of first extrusion orifices arranged in a circle to produce a plurality of parallel strands of said plastic, periodically interconnecting said extrusion orifices with an annular extrusion orifice that is in open communication with all of said first extrusion orifices, and simultaneously extruding plastic through said first orifices and through said annular orifice to continue to produce said parallel strands and to produce a continuous annular plastic member interconnecting said strands.

References Cited
UNITED STATES PATENTS 3,050,070    8/1962    Sidelman _____ 32—39
3,252,181    5/1966    Hureau _____ 18—12

ALEXANDER H. BRODMERKEL, *Primary Examiner.*

J. H. WOO, *Assistant Examiner.*